(No Model.) 3 Sheets—Sheet 1.
A. R. GUSTAFSON.
THRASHING MACHINE.
No. 446,645. Patented Feb. 17, 1891.
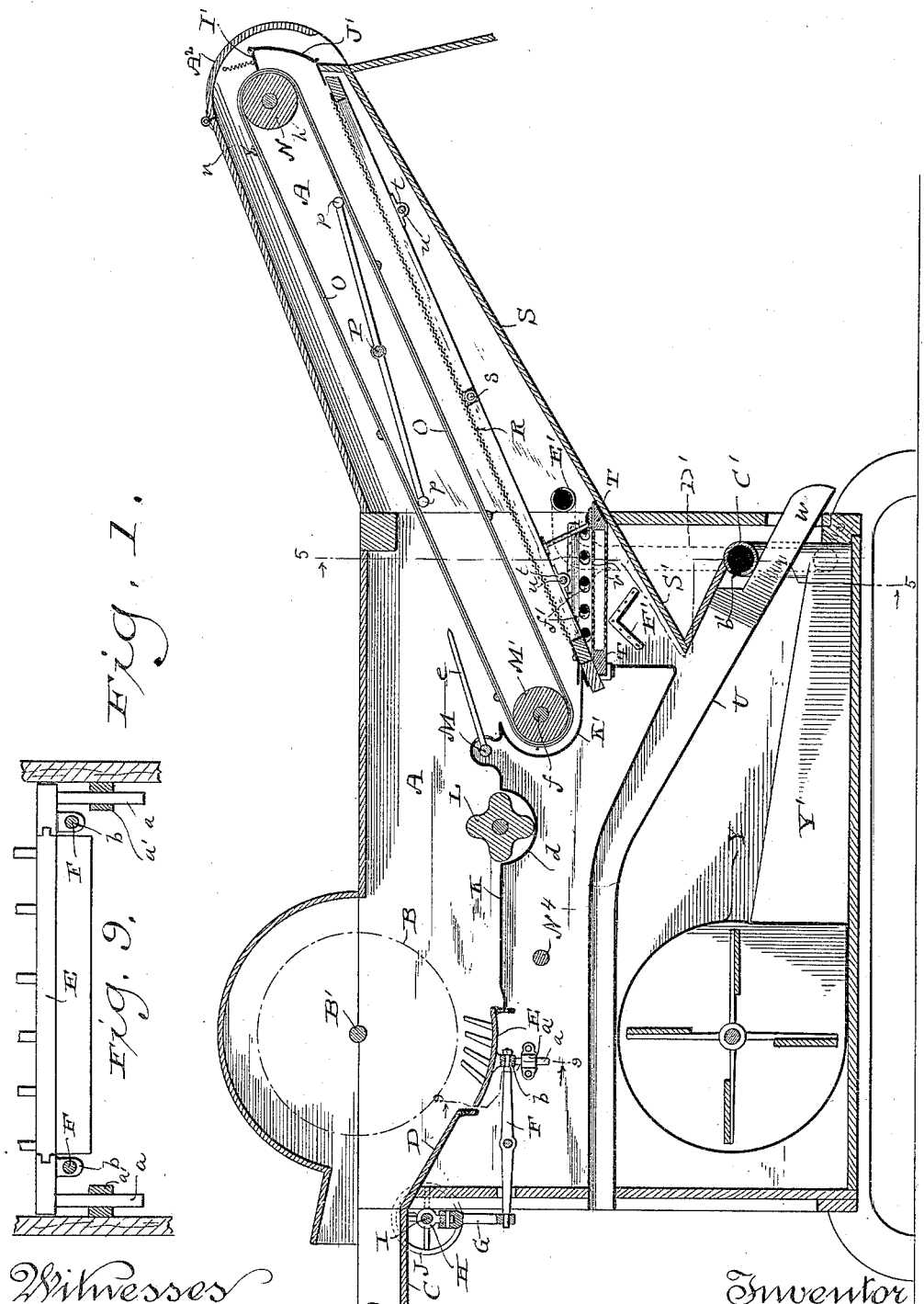
Witnesses
Geo. W. Young
N. E. Oliphant
Inventor
Axel R. Gustafson
By H. G. Underwood
Attorney

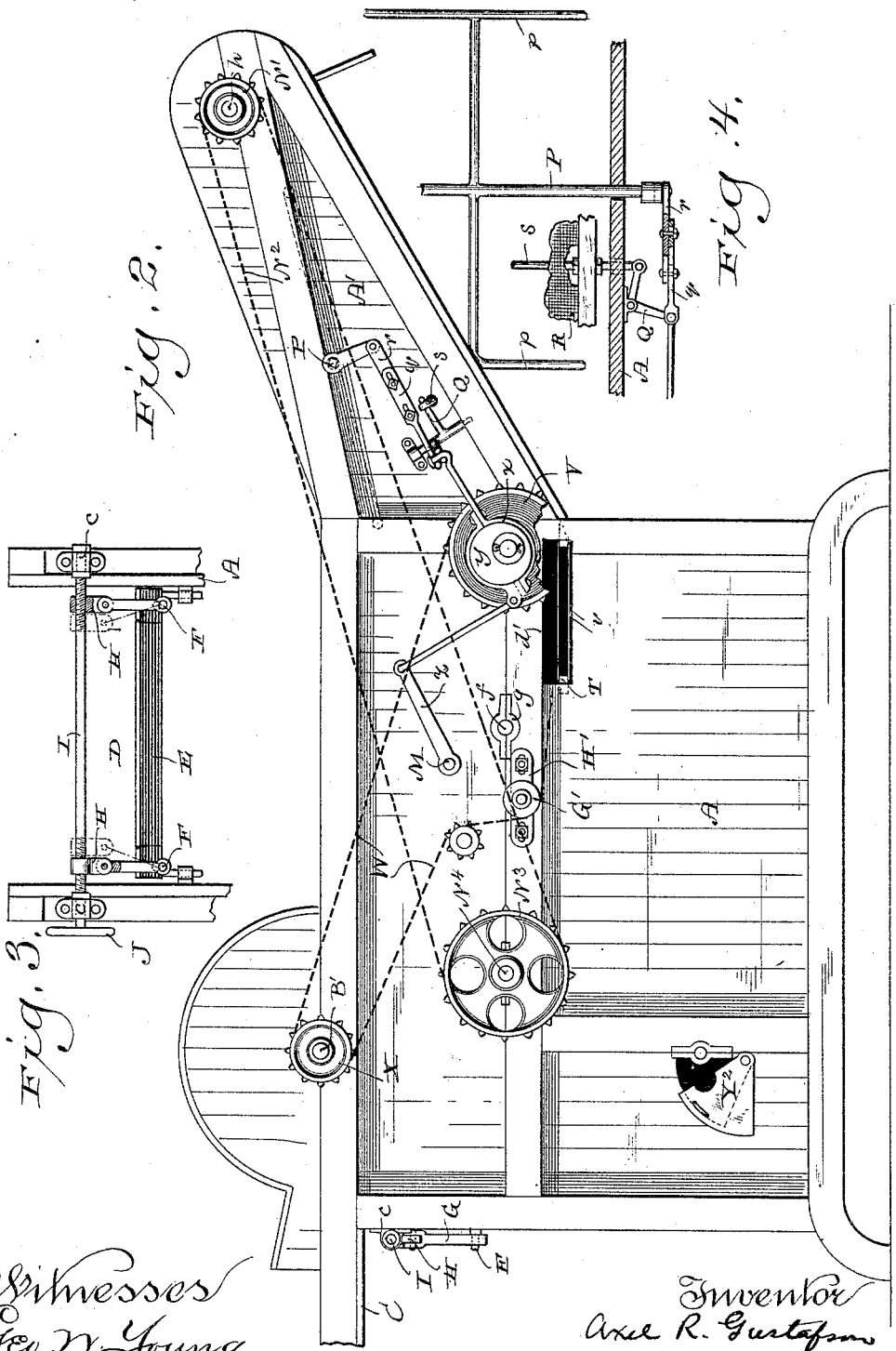

(No Model.) 3 Sheets—Sheet 3.

A. R. GUSTAFSON.
THRASHING MACHINE.

No. 446,645. Patented Feb. 17, 1891.

Witnesses
Geo. W. Young
N. E. Oliphant

Inventor
Axel R. Gustafson
By H. G. Underwood
Attorney

UNITED STATES PATENT OFFICE.

AXEL R. GUSTAFSON, OF ASHLAND, WISCONSIN, ASSIGNOR OF ONE-FOURTH TO WILLIAM F. ANDERSON, OF NEGAUNEE, MICHIGAN.

THRASHING-MACHINE.

SPECIFICATION forming part of Letters Patent No. 446,645, dated February 17, 1891.

Application filed July 28, 1890. Serial No. 360,229. (No model.)

*To all whom it may concern:*

Be it known that I, AXEL R. GUSTAFSON, of Ashland, in the county of Ashland, and in the State of Wisconsin, have invented certain new and useful Improvements in Thrashing-Machines; and I do hereby declare that the following is a full, clear, and exact description thereof.

My invention relates to thrashing-machines; and it consists in certain peculiarities of construction and combination of parts whereby I improve the machines set forth in my patent, No. 417,175, of December 10, 1889, and my applications for patent, Serial No. 342,951, of March 7, 1890, and Serial No. 346,428, of April 3, 1890, as will be hereinafter described with reference to the accompanying drawings, and subsequently claimed.

Figure 5:
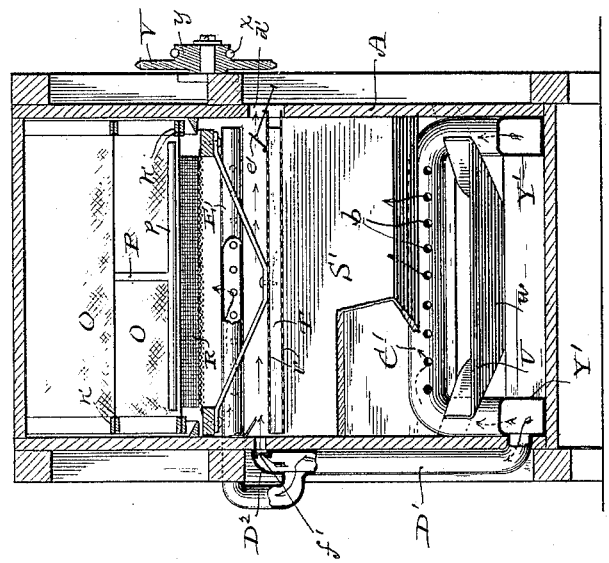

In the drawings, Figure 1 represents a longitudinal section of a thrashing-machine embodying my improvements; Fig. 2, a side elevation of the same; Fig. 3, a detail rear elevation of a mechanism for adjusting the concave of the machine; Fig. 4, a detail plan view, partly in horizontal section, illustrating a vibratory screen and knocker mechanism employed in said machine; Fig. 5, a transverse section taken on line 5 5 of Fig. 1; and Figs. 6, 7, and 8, detail views of a straw-carrier constituting one of my improvements. Fig. 9 represents a section on line 9 9, Fig. 1.

Referring by letter to the drawings, A represents the main casing of my machine, this casing being provided with a rear extension A' at an angle thereto, this extension serving to inclose certain mechanism to be hereinafter described. Arranged within the main casing is the usual thrashing-cylinder B, (shown by dotted lines, Fig. 1,) adjacent to a feed-table C, and eccentrically opposed to the cylinder at the terminus of a chute D, leading from the feed-table, is that portion of the machine commonly termed the "concave," the means for adjusting this concave E with relation to said cylinder being one of the improvements sought to be covered in the present application. Depending from the under side of the concave are eyes $b$, that engage the inner ends of levers F, fulcrumed to the inner sides of the main casing A, and the outer ends of these levers engage links G, that are pivotally connected to shackles H, the latter being screw-threaded on a transverse shaft I, that has its bearings $c$ on said casing, the screw-threads on the shaft for one shackle being right-handed and those for the other left-handed, as is best illustrated in Fig. 3. The shaft I is provided at one end with a crank or hand-wheel J, and by actuating the latter said shaft is turned in its bearings to move the shackles H in a lateral direction, whereby the angle of the links G is changed and the levers F moved on their fulcrums to vary the adjustment of the concave E, this operation being diagrammatically illustrated by dotted lines in Fig. 3.

Extending rearward from a point adjacent to the inner end of the concave E is a horizontal partition K, having a concave depression $d$, in which turns a corrugated roller L, and beneath a convex portion of the partition, in rear of the roller, is a transverse rod M, provided with lifting-fingers $e$, that extend through slots in the latter portion of said partition, this same construction having been shown and described in my application, Serial No. 346,428, above mentioned.

Arranged in rear of a depending portion K' of the horizontal partition K is a roller M' on a shaft $f$, that has its bearings $g$ on the main casing, and the rear upper end of the casing-extension A' is provided with bearings for a shaft $h$, that carries a roller N. On the rollers M' N is arranged a straw-carrier O, and the peculiarities of this straw-carrier constitutes another of my improvements.

Figure 6:
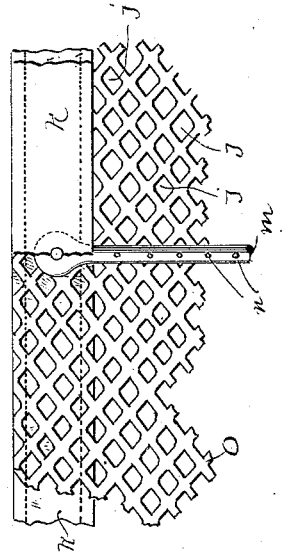
Figure 7:
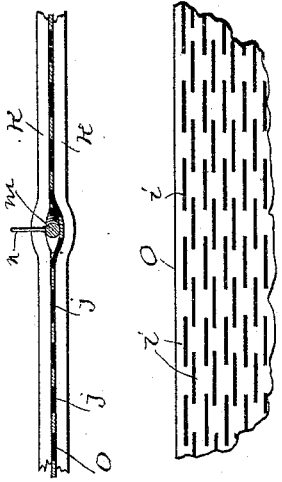
Figure 8:
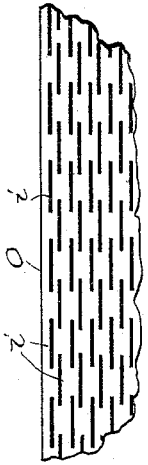

The straw-carrier is made of a sheet of leather or analogous material, that in a dry state is slitted at regular intervals by a suitable tool, the slits $i$ being in rows, and those in one row break joints with those in the rows next adjacent, as illustrated in Fig. 8. After the operation of slitting has been accomplished the material is dampened and stretched out, and thus a series of diamond-shaped perforations $j$, in parallel diagonal rows, as shown in Fig. 6, are formed and remain after said material dries. The material having been stretched and dried, as above described, the edges of the same are re-enforced by tapes $k$, of leather or other suitable material, and the ends of the sheet are united to form the base of the improved straw-carrier. The latter, being more flexible than those in general use, runs with less friction, thereby effecting a saving in power, and is less liable to break, while at the same time I do away with link belts and sprocket-wheels ordinarily employed to drive said straw-carrier. At intervals in the length of the endless sheet or base just described I secure the ends of transverse strips $m$ under the outer tapes $k$, and these transverse strips are provided with fingers $n$, that aid to elevate the straw, and also serve to keep clear the space between the straw-carrier and depending portion K' of the horizontal partition above described. The roller N is provided with a sprocket-wheel N', and a link belt $N^2$ connects this wheel with a similar one $N^3$ on the main shaft $N^4$, as shown in Fig. 2, said main shaft being connected to the cylinder-shaft B' by any suitable gear, (not shown)—as, for instance, a pinion and gear-wheel similar to those illustrated in my said application, Serial No. 346,428.

Extending through the casing-extension A', between the inner sides of the straw-carrier, is a transverse shaft P, having lateral $+$-shaped branches or knockers $p$, and one end of this shaft is cranked to one arm of a bell-crank Q (arranged at the outside of said casing-extension) by means of links $q$ $r$, these links being preferably adjustable one upon the other, as best illustrated in Figs. 2 and 4. The other arm of the bell-crank is connected to a rod $s$ on the under side of a screen R, arranged beneath the straw-carrier and provided with depending eyes $t$, that loosely engage stationary guide-rods $u$, supported in the casing-extension A', and beneath this screen is a chute S, that discharges onto the upper one of two or more riddles $v$ in a frame T, that is in turn connected to said screen by suitable hangers. In practice the riddles are of different mesh, and such grain as passes through the same will fall on a continuation S' of the chute S and be discharged into an inclined flue U, the latter being provided with a delivery-spout $w$ at the rear end of the casing.

With the exception of the knocker mechanism and the riddles connected to the screen, the construction just described is not materially different from what is set forth in my application, Serial No. 346,428, and, as in said application, the bell-crank Q is linked to a separable ring $x$ on an eccentric $y$, projecting from a sprocket-wheel V, and the separable ring is also linked to an arm $z$ on the rod M, that carries the lifting-fingers above described. Motion being communicated to the sprocket-wheel V by means of a link belt W, engaging with another sprocket-wheel X on the shaft B' of the thrashing-cylinder, as shown in Fig. 2, a reciprocating movement is imparted to said lifting-fingers by the eccentric mechanism, and the latter also imparts a vibratory movement to the screen R and riddle-frame T, while at the same time the knocker-shaft P and its branches $p$ are oscillated to vibrate the straw-carrier, and thereby dislodge such grain as might otherwise escape.

As in my previous patent and applications above named, a fan-case Y is arranged in the main casing A, and leading from this fan-case is a bifurcated wind-trunk Y', similar to the one shown in said applications, the furcations of said wind-trunk being connected to the ends of a transverse spout C', that in the present case is provided with perforations $b'$, that discharge into the flue U, above described, this flue being horizontally extended through the front of the machine to carry off the blast from the fan, the admission of outside air to said fan-case being regulated by a gate $Y^2$, as shown in Fig. 2, and also shown and described in my application Serial No. 346,428.

Leading up from one of the furcations of the wind-trunk Y is a flue D', that has a horizontal box $D^2$, provided with a series of perforations above the riddle-frame T, and thus chaff and dirt mingled with grain as they fall onto the uppermost riddle are discharged through an opening $d'$ in the casing A, opposite said outlet of the flue D', this opening being controlled by a flap $e'$, adjustable on said riddle to deflect said grain and prevent the latter being carried off with the chaff and other impurities, while at the same time a gate $f'$ is employed to regulate the amount of air admitted through said perforations.

A branch E' of the flue D' is extended transversely of the casing-extension A', beneath the screen R, and this branch is provided with a series of perforations through which air is discharged to pass up through said screen and the straw-carrier O to blow chaff and other impurities out at the rear end of the machine.

Beneath the riddle-frame T is a $\Lambda$-shaped deflector F', that prevents the air discharged through the perforations $b'$ in the transverse spout from blowing upward. The general operation of the machine is similar to that described in my application Serial No. 346,428, except as to certain details set forth herein, and therefore further description is not deemed necessary.

In order to take up slack in the belt W, I employ a belt-tightener comprising a roller G' on a plate H', the latter being adjustably secured to the main casing, as shown in Fig. 2.

As shown in Fig. 9, I prefer to make the concave in three pieces, the side pieces being permanent and provided with the eyes $b$, above described, while the center piece is dovetailed to said side pieces, so as to be readily removed, whereby I may substitute a plain concave for the toothed one shown in the drawings. In order to guide the concave in its adjustment, I also prefer to provide the side pieces thereof with depending pins $a$, that work in guides $a'$ on the inner sides of the main casing. In the upper end of the casing-extension A', I arrange a spring-controlled gate I', that normally impinges against the straw-carrier O, and below this gate is a shield J', this construction being shown in Fig. 1. The gate I' yields to the fingers *n* on the straw-carrier, and such grain as may accumulate on said straw-carrier is dropped onto the screen R. Said gate also prevents straw being carried back on the carrier when the latter is run at high speed, it being understood that the hinged portion A² of the casing-extension A' is elevated to permit said straw to pass out of the machine.

Having thus described my invention, what I claim as new, and desire to secure by Letters Patent, is—

1. The combination, with the thrashing-cylinder and a concave eccentric thereto, of levers having their inner ends connected to the concave, a shaft, shackles laterally adjustable on the shaft, and links connecting the shackles and outer ends of the levers, substantially as set forth.

2. The combination, with suitable rollers and a driving-gear, of a straw-carrier mounted on said rollers and having a base of leather or analogous material, slitted at regular intervals while in a dry state, the slits breaking joints with each other, and afterward dampened, stretched, dried, and joined at its ends, substantially as set forth.

3. The combination, with suitable rollers and a driving-gear, of a straw-carrier mounted on said rollers and having a base comprising a sheet of leather or analogous material, slitted at regular intervals while in a dry state, the slits breaking joints with each other, and afterward dampened, stretched, dried, and joined at its ends, and tapes secured to the edges of said material, substantially as set forth.

4. The combination, with suitable rollers and driving-gear, of a straw carrier mounted on said rollers and having a base comprising a sheet of leather or analogous material, slitted at regular intervals while in a dry state, the slits breaking joints with each other, and afterward dampened, stretched, dried, and joined at its ends, tapes secured to the edges of said material, and transverse strips having their ends secured to said sheet, substantially as set forth.

5. The combination of an endless straw-carrier, a transverse shaft arranged between the inner sides of the same, knockers carried by the shaft, a screen loose on transverse guides below the straw-carrier, the bell-crank Q, having one arm thereof connected to the screen, a crank on one end of the knocker-shaft, the link *r*, secured to the crank, the link *q*, adjustably connected to the one *r*, and the eccentric *y*, having the link-and-ring connection *x* with the other arm of the bell-crank and link *q*, substantially as set forth.

6. The combination of a straw-carrier, a vibratory screen parallel thereto, a chute arranged below the screen, a frame suspended from the lower end of said screen adjacent to the chute, and riddles serially arranged in the frame, substantially as set forth.

7. The combination of a straw-carrier, a vibratory screen parallel thereto, a chute arranged below the screen, a frame suspended from the lower end of said screen adjacent to the chute, riddles serially arranged in the frame, the flue U, having an opening therein for said chute, a fan and its case, a bifurcated wind-trunk leading from the fan-case, and a transverse spout connected at its ends to the furcations of the wind-trunk and having its discharge into said flue below the riddles, substantially as set forth.

8. The combination of vibratory riddles, a chute arranged below the riddles, the flue U, having an opening therein for the chute, a fan and its case, a wind-trunk leading from the fan-case, the flue D', connected to the wind-trunk, the box D², communicating with the latter flue and provided with a row of perforations to sweep the surface of the uppermost riddle, and the outlet *d* opposite said box, substantially as set forth.

9. The combination of vibratory riddles, a chute arranged below the same, the flue U, having an opening therein for the chute, a fan and its case, a wind-trunk leading from the fan-case, the flue D', connected to the wind-trunk, the perforated box D², communicating with the latter flue above the riddles, and the gate *f*, arranged adjacent to the perforations, substantially as set forth.

10. The combination of vibratory riddles, a chute arranged below the same, the flue U, having an opening therein for the chute, a fan and its case, a wind-trunk leading from the fan-case, the perforated box D², communicating with the latter flue above the riddles, the outlet *d* opposite said box, and the flap *e*, adjustable on the uppermost riddle adjacent to said outlet, substantially as set forth.

11. The combination of an endless straw-carrier, a vibratory screen arranged beneath the same, riddles supported by the screen and movable therewith, a wind-flue having its discharge over the riddles, an outlet opposite the discharge, and a branch of said flue arranged to discharge under the screen, substantially as set forth.

12. The combination of vibratory riddles, a chute arranged beneath the same, the flue U, having an opening therein for the chute, a fan and its case, a bifurcated wind-trunk leading from the fan-case, a transverse spout connected at its ends to the furcations of the wind-trunk and having a discharge into said flue, and the deflector F', arranged between said chute and riddles, substantially as set forth.

13. The combination, with the thrashing-cylinder, of a concave eccentric thereto and provided with depending pins, guides engaging the pins, levers connected to the concave, and suitable means for adjusting the levers, substantially as set forth.

14. The combination of the straw-carrier, a spring-controlled gate arranged to impinge against the same at the rear of the machine, and a shield arranged below the gate, substantially as set forth.

In testimony that I claim the foregoing I have hereunto set my hand, at Milwaukee, in the county of Milwaukee and State of Wisconsin, in the presence of two witnesses.

AXEL R. GUSTAFSON.

Witnesses:
N. E. OLIPHANT,
WM. KLUG.